United States Patent
Eder et al.

[11] Patent Number: 5,618,730
[45] Date of Patent: Apr. 8, 1997

[54] ASSEMBLY AND PROCESS FOR PURIFYING EXHAUST GAS, AND A PROCESS FOR RECLAIMING CONTAMINATED SOIL

[76] Inventors: Günter Eder, Zellerstrasse 37; Rudolf Kahr, Barbarastrasse 16, both of 5730 Mittersill, Austria

[21] Appl. No.: 550,216

[22] Filed: Oct. 30, 1995

[30] Foreign Application Priority Data

Oct. 28, 1994 [AT] Austria ................. 2020/94

[51] Int. Cl.⁶ ........................... C12M 3/00
[52] U.S. Cl. ................. 435/289.1; 435/297.1; 435/299.1; 55/528; 96/108; 210/500.27; 588/900; 588/901
[58] Field of Search ............... 422/120, 122; 435/262, 262.5, 264, 266, 289.1, 297.1, 299.1; 55/528; 96/108, 153, 154; 210/500.27; 588/900, 901

[56] References Cited

U.S. PATENT DOCUMENTS 5,064,763  11/1991  Benz ....................... 435/266
5,071,660  12/1991  Hopkins et al. ............ 426/8
5,501,977  3/1996   Cruze ..................... 435/266

FOREIGN PATENT DOCUMENTS 4041233    6/1992  Germany.
4204190    8/1992  Germany.
9216668.7  3/1993  Germany.

*Primary Examiner*—David A. Redding
*Attorney, Agent, or Firm*—Herbert L. Lerner; Laurence A. Greenberg; Werner H. Stemer

[57] ABSTRACT

Gases such as effluent air from industrial processes are cleaned in a purifying assembly which contains a filter bed with a bulk quantity of a cleaning composition. The cleaning composition is populated with micro-organisms and it is a mixture of grapeseeds (1–95%), beer draff (1–50%), minerals (0.01–40%) and lava dross or lava split. 13. Contaminated soil may be reclaimed with the method by forming a bulk mixture of the soil to be reclaimed with the purifying composition. Air is then conducted through the bulk mixture for cleaning the same.

11 Claims, 1 Drawing Sheet

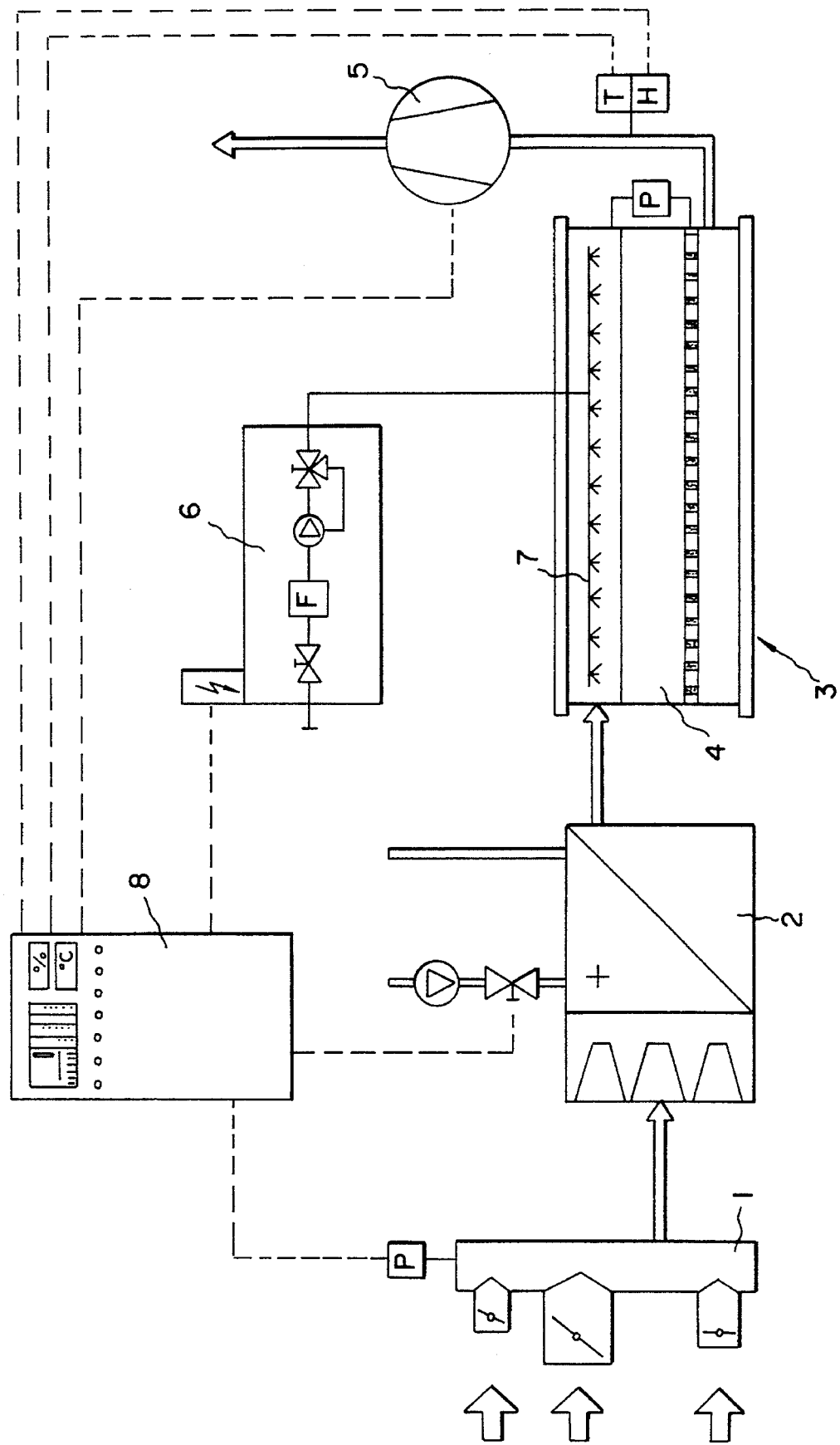

ASSEMBLY AND PROCESS FOR PURIFYING EXHAUST GAS, AND A PROCESS FOR RECLAIMING CONTAMINATED SOIL

BACKGROUND OF THE INVENTION

1. Field of the Invention

The invention relates to a composition for purifying gases, in particular effluent air, which are conducted through a bulk volume of the composition. The bulk volume is thereby populated with micro-organisms.

2. Description of the Related Art

German publication DE-U 92 16 668 discloses a bulk filter for biological gas filters containing grapeseeds and minerals. While the bulk material is essentially suitable for removing highly odorous noxious components from the gases, it has been found that it takes rather a long time after starting the process before the filter reaches its full purifcation rate. Additionally, the purification rate is less than satisfying even after that time.

German patent publication DE-A 43 04 190 discloses a process and a device for the purification of gases; the gases to be purified are thereby conducted through a bulk volume of organic material. As an organic material there is proposed peat-heather-mixtures, bark chips, wood splinters, compost or also other mixtures of peat/synthetic material, compost/synthetic material or the like. In order to obtain a sufficient capacity of the biofilter it is necessary to feed the micro-organism populating the organic layer with nutrient substances. As a quite undesired side-effect, however, unwanted micro-organisms are supported as well, which have to be suppressed by adding toxic agents. Therefore the operation of such a biological filter is elaborate and depends from a precise control and regulation. Furthermore, the use of toxic agents is risky for obvious reasons of environmental protection.

German patent publication DE-A 041 233 discloses a process eliminating odoriforous substances from exhaust gases with the use of fibrous peak and heather. The efficiency of the filter in that process is improved in that the material is placed in a rotating cylinder. That prior art process, therefore, requires elaborate mechanical components and it cannot be used in an economical fashion for various applications.

European patent publication EP-A 492 135 discloses a device for purifying air, in which filter beds populated with micro-organisms are disposed in a purification column. Bark chips are described as a filter bed. Elaborate humidification equipment is required in order to obtain adequate and acceptable purification efficiency.

Further biological filters are described in German patent publication DE-A 41 02 167, in European patent application EP-A 497 214 and in U.S. Pat. No. 5,232,676 (EP-A 470 468). However, similar disadvantages as described above are encountered with those processes and devices.

SUMMARY OF THE INVENTION

It is accordingly an object of the invention to provide an assembly and a process for purifying gases, in particular exhaust gases, and a process for reclaiming contaminated soil, which overcomes the hereinafore-mentioned disadvantages of the heretofore-known devices of this general type and which allows satisfactory gas purification with a simple and inexpensive assembly and composition, virtually immediately following start-up of the assembly. It is thereby an important object that all environmentally unfriendly contaminants as well as odoriferous components of the gas, e.g. alcohols, ketones, aromatics, esters, aldehydes and amines, are removed from the gas effectively and almost completely. The operation of the filter should be very stable in order to obtain a good purification characteristics without elaborate control and regulation of the various operating parameters. The entire construction of the filter should be as simple as possible in order to enable an economic purification of gases in numerous fields of application.

Another object of the invention is to provide a composition which can be produced in a simple way at low cost and which does not cause any environmental problems in the course of its disposal.

With the foregoing and other objects in view there is provided, in accordance with the invention, an assembly for purifying gases, such as effluent air and exhaust gases. The assembly comprises: a bulk quantity of a cleaning composition through which the gases to be purified are guided, the cleaning composition being populated with micro-organisms and being a mixture of components including grapeseeds, beer draff and minerals.

In accordance with an added feature of the invention, the cleaning composition consists essentially of grapeseeds, beer draff, minerals and at least one of lava dross and lava split.

In accordance with an additional feature of the invention, the cleaning composition includes the components at the following weight percentages, relative to a total weight of the composition:

| | |
|---|---|
| grapeseed | 10–95% |
| beer draff | 0.01–10% |
| minerals | 0.01–40%. |

The preferred ranges are:

| | |
|---|---|
| grapeseed | 20–75% |
| malt husks | 0.01–6% |
| minerals | 1–20%. |

In accordance with a further feature of the invention, the lava dross is present at 10–95%, and preferably 25–40% of the total weight of the composition.

In accordance with yet another feature of the invention, the minerals are present in the mixture in the form of rock powder, preferably from greenstone, basalt, serpentine, granite, gneiss, granolite, and volcanic rock. The latter may be from tuff and tuffites.

In accordance with again another feature of the invention, the grapeseed is present in the form of rotten rape.

With the above and other objects in view, there is also provided a method of cleaning a gas, which comprises: saturating the gas to be cleaned with moisture, and guiding the saturated gas at a temperature between 10° C. and 70° C. through a bulk quantity of the above-described cleaning composition, which is populated with micro-organisms.

There is also provided a method of reclaiming contaminated soil, which comprises: forming a bulk material by mixing the soil to be reclaimed with a gas purifying composition, the composition being populated with micro-organisms and being a mixture of components including grapeseeds, beer draff and minerals, and subjecting the bulk material to the flow of a gas, such as air. After the air has been guided through the bulk material and, as a result it is now laden with contaminants, it may be further cleaned by filtering it through the above-described assembly. The purification of the invention is preferably performed while the gas is at a temperature of between 10° and 70° C.

According to the present invention the composition consists mainly of grapeseeds (grape pips), mineral additives, beer draffs (spent barley, malt husks), and preferably lava dross (lava coal). Surprisingly, it turned out that a composition of this structure with or without further admixtures represents a good carrier for micro-organisms, by which a particular high capacity with regard to the separation per volume unit of carrier material can be obtained.

The purification of exhaust gas takes places in two steps. The first step is a physical process in the course of which the contaminants are removed from exhaust gas. They are thereby dissolved in the humidity of the biomass. The process is absorption and adsorption. In the water film of the biomass and preferably on the surface and on the fracture face of the grapeseeds there are micro-organisms which, in the second step, biologically reduce the contaminants. The micro-organisms thereby gain energy which allows them to create additional cell substance. The final products of this biological process are carbon dioxide and water. The micro-organisms which convert the contaminant best also have the best chance of survival and procreation.

The composition according to the invention creates the best possible conditions for the micro-organisms and the absorption of the contaminants. The biomass can be specified as a biological and physical storage, whereby the structure for the biomass is developed in a way that the air streams through it with the lowest possible pressure loss and that at the same time channels and conduit tears cannot arise, through which the raw gas would escape without being purified.

Water is the basis in which the micro-organisms live. The biomass provides for the sufficient storage of water. The elevated humidity, furthermore, stores the contaminants and makes them available to the micro-organisms. When there are no contaminants delivered by the untreated gas (i.e. the gas is clean or the assembly is not in operation), then the micro-organisms are supplied with nutriment from the biomass. The micro-organisms required by this invention for the reduction and the removal of contaminants can only exist within a narrow pH-range. This means that acid remainders must be carefully avoided. Otherwise, the biomass could become acidified, especially during its use in the effluent air purification in purification plants. The biomass is adjusted so as to prevent any accidental change of the pH-value, and preferably it is chemically buffered.

While the exact biological/chemical processes underlying the invention may not be exactly understood, it is considered an essential point of the invention that the special mixture causes optimal living conditions for the micro-organisms. Within the scope of the invention it is possible to add further components as far as they do not influence the living conditions for the micro-organisms unfavorably.

It is, however, particularly advantageous if the components are available in the following proportions by total weight:

| grapeseeds | 10–95%, | preferably | 20–75% |
|---|---|---|---|
| lava dross/split | 10–95%, | preferably | 25–40% |
| minerals | 0.01–40%, | preferably | 1–20% |
| beer draffs | 0.01–10%, | preferably | 0.01–6% |

The above ranges in the mixture have resulted in particularly favorable conditions for the micro-organisms and for the operating stability of the claimed assembly.

Other features which are considered as characteristic for the invention are set forth in the appended claims and they will become clear from the following, more specific description.

Although the invention is illustrated and described herein as embodied in an assembly and a process for purifying gases, in particular exhaust gases, and a process for reclaiming contaminated soil, it is nevertheless not intended to be limited to the details shown, since various modifications and structural changes may be made therein without departing from the spirit of the invention and within the scope and range of equivalents of the claims. The construction and the modes of the invention, however, together with additional objects and advantages thereof will be best understood from the following description of the specific embodiment and mode when read in connection with the accompanying drawings.

BRIEF DESCRIPTION OF THE DRAWINGS

FIG. 1 is a diagrammatic illustration of an assembly and a system for purifying gases.

DESCRIPTION OF THE PREFERRED EMBODIMENTS

Referring now to the sole figure of the drawing in detail, there is seen an assembly for purifying gases such as effluent air with an undesirable proportion of contaminants, in particular odoriferous substances which are particularly disturbing at boundaries between industrial and residential areas and in regions where residential sections are integrated among industrial complexes.

The gas to be purified is collected in a header 1 as it arrives from various sources. As indicated by the inlet throttles, the header may be selectively subjected to incoming gases. A conditioning unit 2, which receives the gas from the collector header 1, is provided for the purpose of assuring proper gas conditions. In other words, if it is necessary, the gas may be prepared in the conditioning unit 2 with regard to its temperature and its humidity. A cleansing module 3 (purification module) receives the gas from the conditioning unit 2 in properly conditioned form. The gas thereby flows through a bulk quantity 4, i.e. a bulk volume 4, of the filtering mass described herein as the novel composition. A pump 5 then removes the gas from below the bulk quantity 4 and releases the gas through a stack or the like. A high pressure station 6 may be utilized to pressurize water to high pressure. The pressurized water is conducted to the cleansing station 3 where it is sprinkled onto the bulk material via suitable nozzles 7 (e.g. vaporizer nozzles). A control and regulating unit 8 is connected to and regulates the process conditions, in particular the high pressure station 6, and the cleansing module 3. For that purpose, the control unit 8 is supplied with suitable signals from sensors P (pressure sensors), T (temperature) and H (humidity). It should be understood that the assembly as diagrammatically illustrated allows proper control and regulation of the process parameters and, most importantly, satisfactory adaptation of the process parameters to the specific composition of the gas. In other words, the process may be optimized in dependence on the gas and the contaminant contents.

The various components of the novel purifying composition of the present invention can be produced in the following way:

Grapeseeds

They come from the mash from wine production. All known kinds of wine can be used, independently of the size of grapeseeds. The mash is rotted with a conventional aerobic technique. At the end of this process the grapeseeds (pip) are filtered out and smashed. In this condition the material can be stored, as it has been found to have a superlative shelflife and it remains in a useful condition for a long time. The grapeseeds processed in this way may also be stored after mixing in the novel biomass.

The grapeseeds are developed in a multistage process. It is essentially the skin of the seeds which guarantee that the structure remains solid. The grapeseeds and their treatment are responsible for the fact that primarily the desired naturally occurring micro-organisms populate the bulk material. These micro-organisms (actinomyces and streptomyces) are already absorbed from the air in the course of production. Until the moment in which the biomass is applied in the process, the micro-organisms are essentially dormant. Substances like olein, lignin and tannin are present on the skin of the grapeseed. These materials are optimal nutrients for the microorganisms.

Lava Dross - Lava Split

Lava materials are won from quarries at various locations throughout the world. The inventors gained their supplies of the material from an Alpine region between the North of Balaton and Southern Styria, Austria. The mineral, which is also referred to as volcanic loose products, originated in the late Tertiary, i.e. it is some 3.5 million years old. It can occur in the form of volcanic dust, slag sand, lapilli, bombs and blocks.

In the finished biomass it serves, inter alia, as a water reservoir and for loosening the structure. Superior active surface area and high efficiency of the biomass can be obtained. Besides, the retention ability for water is of fundamental importance. The water film on the biomass has been found to define the (decomposing capacity) of the microorganisms. In this context, also, temperature, pH-value and the availability of nutrients play an important role.

The lava dross contains the following trace elements:

|               |           |         |
|---------------|-----------|---------|
| magnesium     | MgO       | 5.10%   |
| calcium       | $CaO_5$   | .25%    |
| ferric oxide  | $Fe_2O_3$ | 14.25%  |
| alumina       | $Al_2O_3$ | 14.30%  |
| silicon dioxide | $SiO_2$ | 49.20%  |
| sulfate       | $SO_3$    | 0.08%   |

The task of the trace elements is to increase the efficiency of the micro-organisms. The pH of the lava dross is 6.4 and, in order to be usable in the biomass, it is first crushed to a grain size of primarily 2 to 20 mm before being mixed with the other components. The density of the lava dross is preferably about 1.160 kg/m$^3$.

Minerals

The minerals provide trace elements for the micro-organisms, to secure the supply with nutritive substances, and they act as a buffer (prevent a change of the pH in the biomass - of particular significance for the purification of exhaust gas within the range of purification plants in order to catch sulfuric compositions and to prevent the formation of sulfuric acid). Preferably diabase, basalt, serpentine, granite, gneiss and granolith are used.

Diabase has been found to be particularly advantageous. It is of volcanic origin and dates from the epoch of the late Tertiary (about 3-5 million years ago). The diabase used in the exemplary embodiment is won from quarries, e.g. in the region around Kitzbühler Alps in Western Austria. It is converted into mineral powder by treaking and by subsequent finest grinding (90% to a grain size of lower than 0.004 mm, 10% between 0.004 and 0.063 mm. The enormous amount of active surface (about 2,500 m$^2$/kg) is based on the fine grinding, the manifold trace elements, and the ionic character of silicon basic material (acid buffering enable an accelerated conversion and an active biological effectiveness.

Chemical Composition of the Minerals

|              |           |              |
|--------------|-----------|--------------|
| silicon oxide | $SiO_2$  | 49.71%       |
| phosphor     | $P_2O_5$  | 0.41%        |
| potassium    | $K_2O$    | 2.22%        |
| calcium      | CaO       | 1.68%        |
| magnesium    | MgO       | 3.99%        |
| sodium       | $Na_2O$   | 3.72%        |
| alumina      | $Al_2O_3$ | 17.7%        |
| copper       | Cu        | 14.3 mg/kg   |
| manganese    | Mn        | 1,050 mg/kg  |
| ferrum       | Fe        | 53,000 mg/kg |
| zinc         | Zn        | 80 mg/kg     |
| cobalt       | Co        | 5.96 mg/kg   |
| molybdenum   | Mo        | 2.06 mg/kg   |
| boron        | B         | 0.70 mg/kg   |

Beer Draff

The beer draff or spent barley is obtained by purifying and hydrating brewing barley. The grain swells up, germinates at a temperature of 14° C. and is converted into malt by careful drying. The malt is bruised, supplied with fresh brewing water and heated to the optimum temperature for enzyme efficiency (mashing).

The mash is then isolated from the solid components. These solid components are referred to as beer draffs. Beer draffs are solid residues of malt. Malt is biologically disintegrated brewing barley. The production of beer, therefore, results in a highly useful side product. The beer draffs are dried (water content app. 5%), so that they can be stored with a stable structure.

One kg dry beer draffs essentially consist of (average):
nutrients:
 raw protein: 261 g
 raw fat: 30 g
 crude fiber: 162 g
 crude ash: 41 g
 N-free extracts: 457 g
 starch: 9.2 g
 saccharine: 1.6 g
minerals:
 calcium: 0.46 g
 phosphor: 0.73 g
 sodium: 0.45 g
 magnesium: 0.34 g
trace elements:
 ferrum: 190 mg
 zinc: 85 mg
 manganese: 50 mg
 copper: 14 mg
 cobalt: 0.18 mg
 selenium: 1.10 mg
vitamins:
 B1: 1.26 mg
 B2: 0.91 mg
 B6: 0.62 mg
 B12: 38.9 µg E: 25.7 mg biotine: 140 mg nicotine acid: 38.9 μg etc.

amino acids and fatty acids

The storage of the materials takes place as follows: grapeseeds—in warehouses directly on the floor; lava split, minerals and beer draffs in plastic bags or big bags. Storage temperature should be maintained between +10° C. and 30° C.

Shortly before the purifying composition is to be used in the novel assembly, various components are fed into a rotating mixing cylinder via a dosing facility. In the mixing cylinder they are mixed and prehumidified. The mixing cylinder is provided mixing vanes similarly to ploughshares for optimum mixing results. The vanes are disposed at an angle of 7° to 12°. Before dosing the lava dross is crushed to a grain size of 2 to 20 mm in a breaking facility. The humidification is effected with special high pressure atomizer nozzles and a humidity of 10–20% is standardized.

After leaving the mixing cylinder the biomass is filled into large bags. Therein they are delivered to the place of usage and filled into containers by a crane.

During transport the temperature should not be below +10° C., it can, however, also be lower for a short time. Freezing has to be avoided in any case.

A particular quick starting phase can be obtained, if the grapeseeds exist in a condition disintegrated for the population with micro-organisms. This can for example be obtained in breaking or grinding the grapeseeds won from the husks of grapes. The composition can be prepared in a particularly simple way if the grapeseeds exist in the form of rotten husks of grapes. The rotting process creates an optimal culture medium for useful micro-organisms.

The composition according to the invention is provided in a suitable bin in a piling height of 200 to 800 mm. This allows compact and space-saving module and container construction. The flow with the exhaust gas to be purified can take place from bottom to top as well as from top to bottom. Because of the relatively low piling height and the open structure, the pressure loss is small, which means that the capacity requirements of the corresponding aeration and deaeration aggregates can be kept low.

It is advantageous to humidify the gas before it enters the biomass, which preferably takes place in that the water is sprayed or drizzled by atomizer nozzles such that the entire bio filter surface is sprinkled. Due to the small drop size the water can evaporate essentially immediately.

The humidification of the air may also be effected with other humidifying systems, such as, for instance, with a steam humidifier, where the required amount of water is fed in via nozzle sticks or nozzle lances. This can also be realized by a pre-operated air purifier. Another possibility is to bring in the required amount of water into the biomass layer by means of a drainage system.

The composition according to the invention enables a purification within a wide temperature range of about 10° C. to 70° C. Therefore in many kinds of application it is not necessary to actively influence the temperature of the exhaust gas. If necessary, however, heating or cooling of the effluent air can be ascertained in order to secure a temperature in the bio filter which lies in the above mentioned permissible range.

Because of the advantageous growing and living conditions for the micro-organisms the period for starting-up and testing can be reduced from 2 to 3 months for prior art bio filters to two to three weeks for the bio filter according to the invention. It is not necessary to supply nutritive substances for the micro-organisms, because these nutrients are made available by the biomass itself. Quite importantly, also, it is not necessary to add other chemicals. During operating interruptions (week-ends, plant down time, vacation) only a very low fresh-air feed is required to keep up the filter activity.

The invention is applicable in many different fields. Distasteful odors, solvents or organic compositions can be removed from effluent air or other gases with the novel bio filter. The system even allows purification of gas laden with sulfurous compositions.

Typical industries considered are the food industry, purification plants, feeding stuff production, plastics processing, livestock breeding, paper industry, animal body utilization, wood industry, varnish production, printshops, and solvent processing, to name just a few.

Problems with local residents caused by distasteful odors can in many cases be cleared away by bio filters. Those are mostly compositions which origin from rotting or processing plants and animals. Thereby the use for purification plants and sewage sludge plants may be the preferred application. As will be outlined in the following, however, the assembly is also highly suitable for contaminated soil reclamation. Frequent contaminants which cause odor problems are the following: hydrogen sulfide ($H_2S$), mercaptanes, thio-ether, carbonic acids, ammonia and ammonium, and amines.

In contrast with the general removal of odors, industrial contaminants must often be removed for reasons of environmental protection. Also in this case odor inconveniences and problems with local residents occur. A large number of widely differing compositions and compounds can be removed with the bio filters. For example the following, frequently occurring contaminants can be disposed of by means of the bio filter of the invention:

alcohols: methanol, butanol, propanol ketones: acetone, methyl ethyl ketone (MEK)

aromatics: toluene, xylene, styrene ethers: glycolomoethylether aldehydes: formaldehyde, acetaldehyd carbonic acids: butyric acid, propionic acid thio-ethers: dimethylsulphide mercaptanes: methylmercaptan, ethylmercaptan amines: triethylamine, dimethylamine As outlined in the appended claims, the inventors further lay claim to an environmental process in which the novel composition may be utilized, namely to a process of reclaiming contaminated soil. Aeration is often required in the conventional prior art processes. Such aeration results in the production of contaminated gases. If, however, in the course of reclaiming the soil is mixed with a composition described above and supplied with a gas, preferably air, the purification of the gas already takes place in situ. If a once-through process is found to be insufficient, the resulting gas by yet be conducted through the purification assembly with the bulk volume of the purifying composition.

The special advantages of the invention are: the small required filter surface with a low piling height, the lack of a requirement for permanent irrigation of the dumped tower packing and the high costs for water connected therewith, as well as the wide range of temperatures, in which a high efficiency can be obtained. By that a virtually maintenance-free operation is possible.

Examples

Four exemplary compositions A1–A4 were tested. The compositions contained the following mixtures:

A1:

| | |
|---|---|
| grapeseeds | 51% |
| lava dross | 40% |
| mineral diabase | 3% |
| beer draffs | 6% |

A2:

| | |
|---|---|
| grapeseeds | 75% |
| lava dross | 23% |
| mineral diabase | 1% |
| beer draffs | 1% |

A3:

| | |
|---|---|
| grapeseeds | 62% |
| lava dross | 29% |
| mineral diabase | 8.99% |
| beer draffs | 0.00% |

A4:

| | |
|---|---|
| grapeseeds | 63% |
| lava dross | 25% |
| mineral diabase | 6% |
| beer draffs | 6% |

The testing results with the above compositions appear in the following table:

| mixing ratio bio mass | | A1 | A2 | A3 | A4 |
|---|---|---|---|---|---|
| effluent air from experimental sewage clarification plant: | | | | | |
| temperature | °C. | 33 | 31 | 31 | 33 |
| relative humidity of effluent air | % | 97 | 100 | 97 | 100 |
| contaminants: | | | | | |
| bulk depth: 600 mm | | | | | |
| a) smell | | | | | |
| surface loading | m3/m2h | 128 | 263 | 360 | 258 |
| raw gas concentration | GE/m3 | 1400 | 1400 | 1400 | 1400 |
| pure gas concentration | GE/m3 | 490 | 280 | <10 | 530 |
| b) H2S | | | | | |
| surface loading | m3/m2h | 128 | 263 | 360 | 258 |
| raw gas concentration | mg/m3 | 15 | 15 | 15 | 15 |
| pure gas concentration | mg/m3 | 2 | <1 | <1 | 2 |
| effluent air with solvent: | | | | | |
| bulk depth: 600 mm | | | | | |
| contaminant: toluolene | | | | | |
| temperature | °C. | 20 | 21 | 20 | 20 |
| relative humidity of exhaust gas | % | 99 | 99 | 99 | 99 |
| surface loading | m3/m2h | 45 | 45 | 45 | 45 |
| raw gas concentration | mg/m3 | 1185 | 1185 | 1185 | 1185 |
| pure gas concentration | mg/m3 | 218 | 85 | 63 | 194 |
| contaminant: ethylacetate | | | | | |
| bulk depth: 600 mm | | | | | |
| temperature | °C. | 21 | 21 | 22 | 22 |
| relative humidity of exhaust gas | % | 100 | 100 | 100 | 100 |
| surface loading | m3/m2h | 35 | 70 | 70 | 35 |
| raw gas concentration | mg/m3 | 175 | 428 | 428 | 175 |
| pure gas concentration | mg/m3 | 77 | 13 | 1 | 84 |
| contaminant: toluolene | | | | | |
| bulk depth: 600 mm | | | | | |
| temperature | °C. | 18 | 18 | 18 | 18 |
| relative humidity of exhaust gas | % | 97 | 99 | 97 | 100 |
| surface loading | m3/m2h | 15 | 15 | 15 | 15 |
| raw gas concentration | mg/m3 | 1730 | 1730 | 1730 | 1730 |
| pure gas concentration | mg/m3 | 319 | 97 | 35 | 542 |
| exhaust gas with solvent | | | | | |
| bulk depth: 600 mm | | | | | |
| contaminants: | | acetone | isobutanol | styrolene | toluolene | isopropyl alcohol |
| temperature | 15–40° C. | | | | | |
| relative humidity of effluent air | 99% | | | | | |
| surface loading | m3/m2h | 45 | 45 | 45 | 45 | 45 |
| raw gas concentration | mg/m3 | 1250 | 110 | 250 | 22 | 350 |
| pure gas concentration mixing ratio bio mass: see A3 | mg/m3 | 58 | 12 | 1.13 | 0.17 | 37 |

We claim:

1. An assembly for purifying gases, comprising:
a bulk quantity of a cleaning composition through which the gases to be purified are guided, said cleaning composition being populated with micro-organisms and being a mixture of components including grapeseeds, beer draff and minerals.

2. The assembly according to claim 1, wherein said cleaning composition consists essentially of grapeseeds, beer draff, minerals and at least one of lava dross and lava split.

3. The assembly according to claim 1, wherein the gases to be purified are effluent air which is guided through said bulk quantity.

4. The assembly according to claim 1, wherein said cleaning composition includes said components at the following weight percentages, relative to a total weight of said composition:

| | |
|---|---|
| grapeseed | 10–95% |
| beer draff | 0.01–10% |
| minerals | 0.01–40%. |

5. The assembly according to claim 1, wherein said cleaning composition includes said components at the following weight percentages, relative to a total weight of said composition:

| | |
|---|---|
| grapeseed | 20–75% |
| beer draff | 0.01–6% |
| minerals | 1–20%. |

6. The assembly according to claim 2, wherein said lava dross is present at 10–95% of a total weight of said composition.

7. The assembly according to claim 6, wherein said lava dross is present at 25–40%.

8. The assembly according to claim 1, wherein said minerals are present in said mixture in the form of rock powder.

9. The assembly according to claim 8, wherein said rock powder is formed from rocks selected from the group consisting of greenstone, basalt, serpentine, granite, gneiss, granolite, and volcanic rock.

10. The assembly according to claim 9, wherein said volcanic rock is selected from the group consisting of tuff and tuffites.

11. The assembly according to claim 1, wherein said grapeseed is present in the form of rotten grape.

* * * * *